US009026071B2

(12) United States Patent
Chen (10) Patent No.: US 9,026,071 B2
(45) Date of Patent: May 5, 2015

(54) MULTI-SYSTEMS INTEGRATED MODULATION MODULE AND COMMUNICATION DEVICE

(71) Applicant: ISSC Technologies Corp., Hsinchu (TW)

(72) Inventor: Peng-Sen Chen, Hsinchu County (TW)

(73) Assignee: ISSC Technologies Corp., Hsinchu (TW)

(*) Notice: Subject to any disclaimer, the term of this patent is extended or adjusted under 35 U.S.C. 154(b) by 35 days.

(21) Appl. No.: 14/068,096

(22) Filed: Oct. 31, 2013

(65) Prior Publication Data

US 2015/0036725 A1    Feb. 5, 2015

(30) Foreign Application Priority Data

Aug. 2, 2013   (TW) .............................. 102127755 A (51) Int. Cl.
*H04B 1/10*   (2006.01)
*H04L 27/00*  (2006.01)
*H04W 88/06*  (2009.01)

(52) U.S. Cl.
CPC ........... *H04L 27/0008* (2013.01); *H04W 88/06* (2013.01)

(58) Field of Classification Search
USPC .............. 455/103, 105, 114.2, 118, 131, 132, 455/140, 141, 550.1
See application file for complete search history.

(56) References Cited

U.S. PATENT DOCUMENTS

| 7,181,181 B2* | 2/2007 | Lee et al. ....................... 455/260 |
| 8,121,573 B2* | 2/2012 | Haralabidis et al. .......... 455/260 |
| 2009/0190633 A1* | 7/2009 | Smith ............................ 375/148 |
| 2014/0073257 A1* | 3/2014 | Tujkovic et al. ............. 455/63.1 |

* cited by examiner

*Primary Examiner* — Blane J Jackson
(74) *Attorney, Agent, or Firm* — Li&Cai Intellectual Property (USA) Office (57) ABSTRACT

The present disclosure illustrates a multi-systems integrated modulation module. The modulation module includes a first modulation circuit and a second modulation circuit. The first modulation circuit includes a high frequency oscillator and high frequency mixers. The second modulation circuit includes a low frequency oscillator and low frequency mixers. The second modulation circuit couples to the first modulation circuit. The high frequency mixers couple to the high frequency oscillator and the low frequency mixers couple to the low frequency oscillator. The high frequency mixers and the low frequency mixers provide high frequency signals and low frequency signals separately. The frequency mixers mix radio frequency signals with the high frequency signals or low frequency signals. The modulation module forms a first signal path by the first modulation circuit, and forms a second signal path by the first modulation circuit and the second modulation circuit.

20 Claims, 6 Drawing Sheets

MULTI-SYSTEMS INTEGRATED MODULATION MODULE AND COMMUNICATION DEVICE

BACKGROUND

1. Technical Field

The present disclosure relates to a modulation module, in particular, to a multi-systems integrated modulation module.

2. Description of Related Art

With the continuous development of the wireless communication technology, the mobile communication devices with variety functions (such as smart phone, personal digital assistant (PDA), and so on) have become the tools which people communicate with other people in the life. However, since the communication technology evolves for a long time, the communication device may have many different communication technologies existed therein. Therefore, how the communication technologies successfully operate therebetween in the communication device has become an important issue of wireless communication.

In the short distance communication technology, 2.4 GHz ISM frequency (e.g. industrial, scientific and medical) is the common implementation environment. In the practical implementation environment, two transceiver modulation circuits with different protocols are sited around or in the same device (such as the handheld mobile communication device). For example, the transceiver modulation circuit for transmitting the IEEE 802.11b/g wireless local area network (WLAN) signal and the transceiver modulation circuit for transmitting Bluetooth signal may be sited closely to each other or in the same device. IEEE 802.11b/g WLAN and Bluetooth share the 2.4 GHz frequency. Since the frequencies in which the communication technologies operate are close to each other (the oscillating frequency in range 2.4~2.48 GHz), it easily causes the transceiver modulation circuits to generate the interference to each other or frequency pulling effect during the modulation procedure, while the distance between the two transceiver modulation circuits is short.

Figure 1:
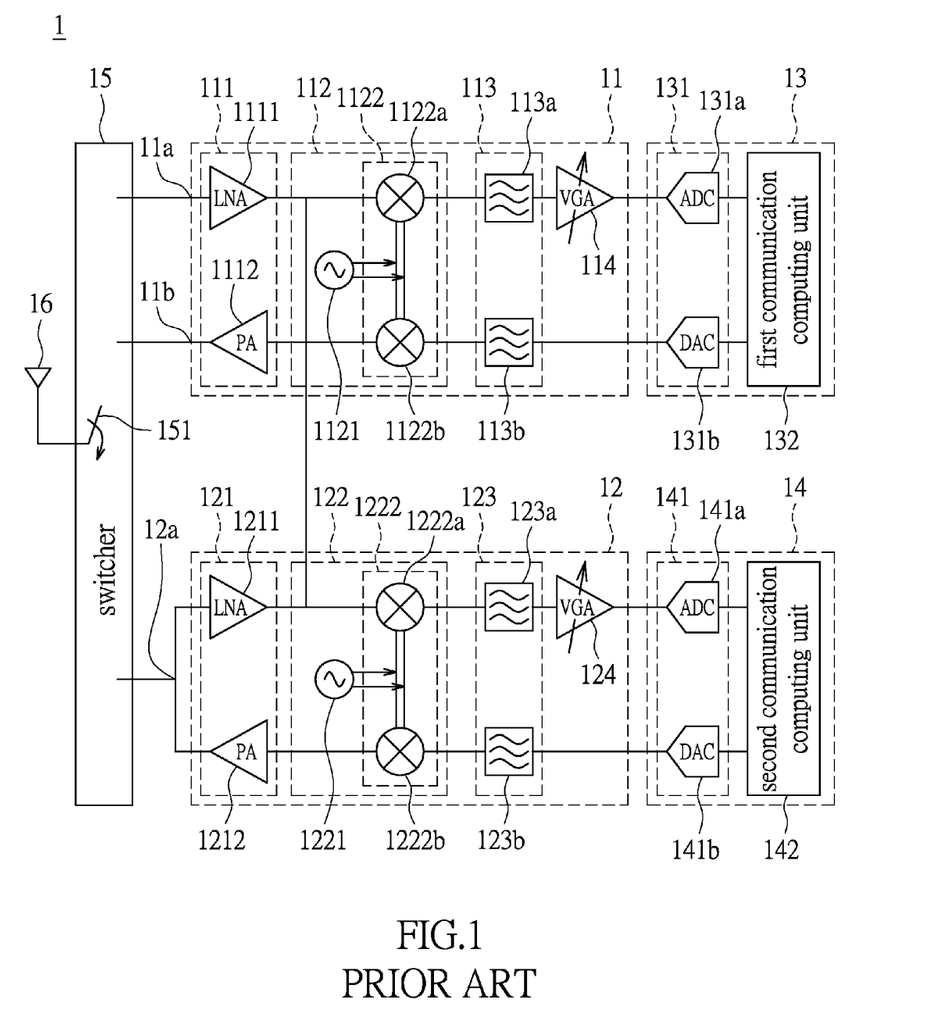
FIG. 1 shows a block diagram of a conventional communication device used the Wi-Fi and Bluetooth technology.

Please refer to FIG. 1. FIG. 1 is a block diagram of a traditional communication device using the Wi-Fi and Bluetooth technology. In FIG. 1, a communication device 1 includes a first modulation module 11, a second modulation module 12, a first communication circuit 13 (which includes a digital-to-analog converting module 131 having an analog-to-digital converter 131a and a digital-to-analog converter 131b and a first communication computing unit 132), a second communication circuit 14 (which includes a digital-to-analog converting module 141 having an analog-to-digital converter 141a and a digital-to-analog converter 141b and a first communication computing unit 142), a switch 15, and an antenna 16. The first modulation module 11 includes a signal amplifier module 111 (which includes low noise amplifier 1111 and a power amplifier 1112), a Wi-Fi modulation circuit 112 (which includes a high frequency oscillator 1121 and a high frequency mixer 1122), a filter module 113 (which includes filter 113a, 113b and a voltage gain amplifier 114). The second modulation module 11 includes a signal amplifier module 121 (which includes a low noise amplifier 1211 and a power amplifier 1212), a Bluetooth modulation circuit 122 (which includes a high frequency oscillator 1221 and a high frequency mixer 1222), filter module 123 (which includes filter 123a, 123b and a voltage gain amplifier 124). The first modulation module 11 is coupled to the first communication circuit 13, and further includes a first receiving terminal 11a and a first transmitting terminal 11b which are coupled to the switch 15. The second modulation module 12 is coupled to the second communication module 12, and further includes a second transceiver terminal 12a coupled to the switch 15. The antenna 16 is switched to connect with the first receiving terminal 11a of the first modulation module 11, the first transmitting terminal 11b of the first modulation module 11, or the second transceiver terminal 12a in the second communication module 12 by the switch 15. The first receiving terminal 11a can receive the Wi-Fi signal or the Bluetooth signal when the switch 15 switches the antenna 16 to connect with the first receiving terminal 11a. The first transmitting terminal 11b can transmit the Wi-Fi signal when the switch 15 switches the antenna 16 to connect with the first transmitting terminal 11b. The second transceiver terminal 12a can transmit the Bluetooth signal when the switch 15 switches the antenna 16 and to connect with the first transceiver terminal 11b.

In the circuit design, as shown in FIG. 1, the traditional communication device having WiFi and Bluetooth coexisted therein usually has signal amplifier modules 111, 121, filter modules 113, 123, high frequency mixers 1122, 1222, and high frequency oscillator 1121, 1221 respectively. The high frequency mixer 1122 has a high frequency receiving mixer 1122a and a high frequency transmitting mixer 1122b. The high frequency mixer 1222 has a high frequency receiving mixer 1222a and a high frequency transmitting mixer 1222b. It's noted that, the high frequency circuit in the circuit design usually needs the larger circuit area in general, and thus also has the higher cost. In the trend which the user pursues the slim, thin, short, and small product, reducing the circuit area is also an important issue.

On the other hand, the second modulation module 12 for modulating the Bluetooth signal and the first modulation module 11 for modulating the Wi-Fi signal are disposed closely to each other. Since the second modulation module 12 cannot transmit the Wi-Fi signal while the second modulation module 12 transmits the Bluetooth signal, the communication device 1 cannot supply the high task duty operation of Bluetooth and Wi-Fi. In other words, the communication device 1 only can transmit the Bluetooth signal when the switch 15 switches the antenna 16 to connect with the second transceiver terminal 12a. Therefore, when the communication device 1 wants to transmit the Wi-Fi signal at the first transmitting terminal 11b, the communication device 1 cannot transmit the Wi-Fi signal, and must wait until the switch 15 switches the antenna 16 to connect with the first transmitting terminal 11b. Accordingly, the transmission quantity becomes worse, and the high latency may exist. However, for the application program which is sensitive to the latency (e.g. Voice over internet protocol, VoIP), the above operation may causes some problem. Since the traffic of the kind is the voice traffic, the serious delay cannot be tolerated. Moreover, the conflicting problem will cause the poor quality of the voice transmission. To sum up, in the wireless communication technology, it still has to improve the circuit structure, which is disposed in the communication device of multi-protocols used sharing frequency.

SUMMARY

An exemplary embodiment of the present disclosure provides a multi-systems integrated modulation module. The modulation module includes a first modulation circuit and a second modulation circuit. The first modulation circuit includes a high frequency oscillator and high frequency mixers. The second modulation circuit includes a low frequency oscillator and low frequency mixers. The second modulation circuit couples to the first modulation circuit. The high frequency mixers couple to the high frequency oscillator and the low frequency mixers couple to the low frequency oscillator. The high frequency mixers and the low frequency mixers provide high frequency signals and low frequency signals separately. The frequency mixers mix radio frequency signals with the high frequency signals or low frequency signals. The modulation module forms a first signal path by the first modulation circuit, and forms a second signal path by the first modulation circuit and the second modulation circuit.

An exemplary embodiment of the present disclosure provides a communication device. The communication device includes a multi-systems integrated modulation module and an antenna, wherein the antenna is coupled to at least one of transceiver terminals of the multi-systems integrated modulation module, and the multi-systems integrated modulation module is same to above. The antenna uses for receiving or transmitting the radio frequency signal.

To sum up, in the multi-systems integrated modulation module provided by the exemplary embodiment of the present, a combining method that a high frequency oscillator to be the major frequency mixer and a low frequency oscillator to fine tuning the frequency is used, it may generate a first communication path signal and a second communication path signal respectively. Avoiding the frequency pulling effect or the interference between the different communication circuits which have to use the high frequency oscillators to modulate the different signals for communication systems in traditional. Furthermore, the circuit area of low frequency oscillator doesn't like the high frequency oscillator, which needs larger area. It reduces the area of the communication circuit and the cost of the manufacturing efficaciously.

It is worth noting, by the multi-systems integrated modulation module provided by the exemplary embodiment of the present invention may receive and transmit the first communication systems signal and the second communication systems signal simultaneously, since the present invention may raise the traffic and the transmission quality effectively.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which is illustrated in the accompanying drawings. Wherever possible, the same reference numbers are used in the drawings and the description to refer to the same or like parts.

Figure 2:
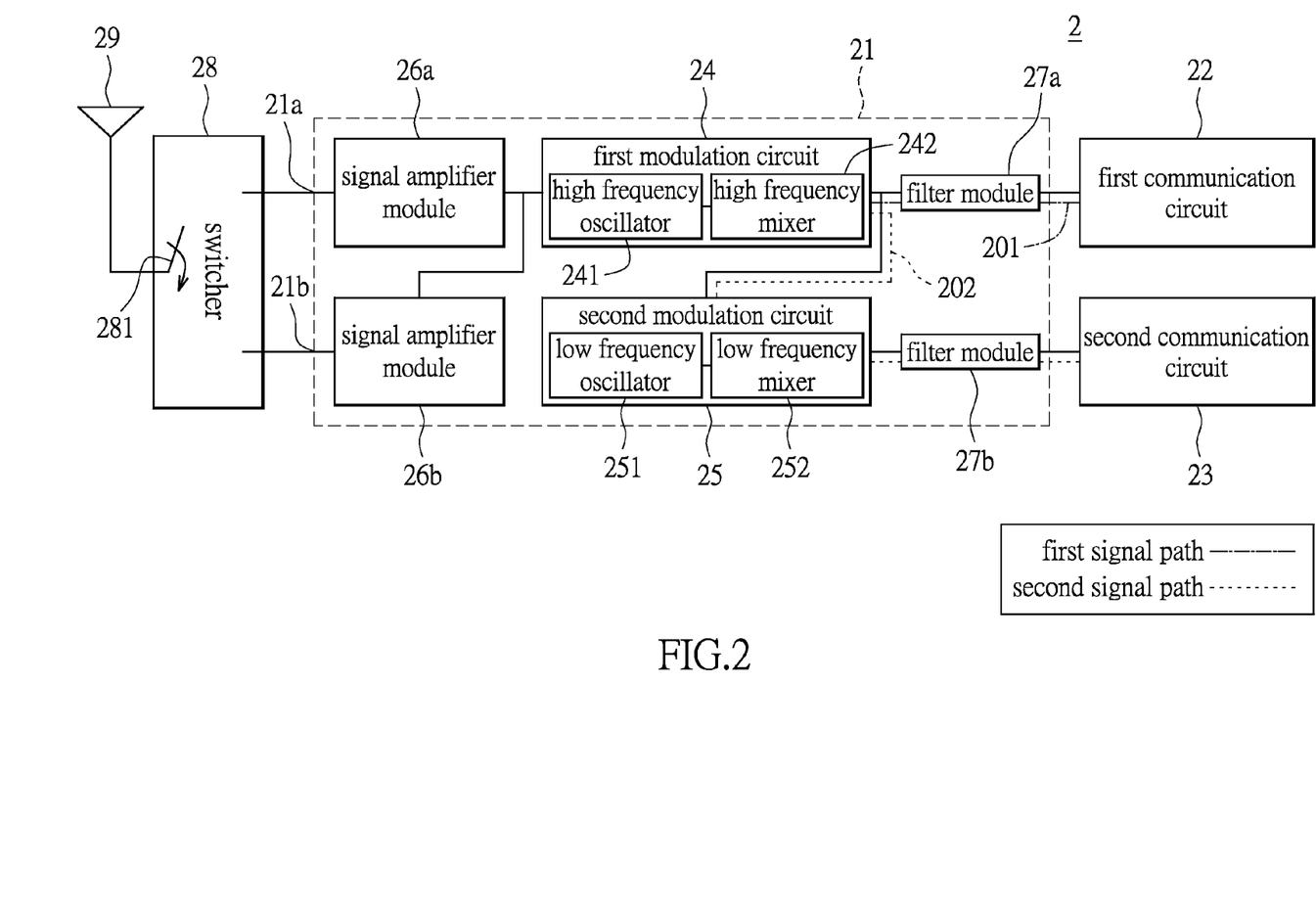
FIG. 2 shows a block diagram of a multi-systems integrated modulation module in the communication device according to an embodiment of the present invention.

Please referring to FIG. 2, FIG. 2 shows a block diagram of a multi-systems integrated modulation module in the communication device according to an embodiment of the present invention. The present invention provides a multi-systems integrated modulation module 21. FIG. 2 includes a modulation module 21, a first communication circuit 22, a second communication circuit 23, a switch 28 and an antenna 29. The modulation module 21 has a first transmitting terminal 21a and a second transceiver terminal 21b. The modulation module 21 includes a first modulation circuit 24, a second modulation circuit 25, signal amplifier modules 26a, 26b and filter modules 27a, 27b. The first modulation circuit 24 includes a high frequency oscillator 241 and a high frequency mixer 242. The second modulation circuit 25 includes a low frequency oscillator 251 and a low frequency mixer 252. The high frequency oscillator 241 is coupled to the high frequency mixer 242, and the low frequency oscillator 251 is coupled to the low frequency mixer 252. The modulation module 21 is coupled to the first communication circuit 22 and the second communication circuit 23, and the first transmitting terminal 21a and the second transceiver terminal 21b of the modulation module 21 are coupled to the switch 28, and further the switch 28 is coupled to the antenna 29.

In the embodiment of the present invention, the modulation module 21 includes a first signal path 201 and a second signal path 202, wherein the first signal path 201 means that the signal passes through the first modulation circuit 24 and forms the signal received path, and the second signal path 202 means that the signal passes through the first modulation circuit 24 and the second modulation circuit 25 and forms the signal received path.

The data signal of the first communication system is received by the first communication circuit 22 of the modulation module 21, and then the data signal of the first communication system is modulated the high frequency oscillating signal (achieving by mixing the data signal and the high frequency oscillating signal) by passing through the first modulation circuit 24 of the modulation module 21 to generate a first radio frequency signal. Hereafter, the first radio signal is transmitted to the antenna 29 through the first transmitting terminal 21a of the modulation module 21 or the second transceiver terminal 21b of the modulation module 21, so as to transmit the first frequency radio signal to another communication device (not illustrated).

Moreover, in the first communication path 201, the modulation module 21 may receive the first radio signal transmitted by another communication device through the antenna 29.

The first modulation circuit 24 of the modulation module 21 receives the first radio signal through the second transceiver terminal 21b of the modulation module 21, and may demodulate the first radio frequency signal to the first communication data signal by the first modulation circuit 24 and the filter module 27a (achieving by mixing the first radio frequency signal and the high frequency oscillating signal), and transmit the first communication data signal to the first communication circuit 22.

The data signal of the second communication system is received by the second communication circuit 23 of the modulation module 21. The data signal of the second communication system modulates the low frequency oscillating signal by via the second modulation circuit 25 (achieving by mixing the data signal and the low frequency oscillating signal), and then the low frequency oscillating signal which after modulated modulates the high frequency oscillating signal by the first module circuit 21 (achieving by mixing the low frequency oscillating signal after modulated and the high frequency oscillating signal) to generate a second radio signal. Hereafter, the second radio signal is transmitted to the antenna 29 through the second transceiver terminal 21b of the modulation module 21, so as to transmit the second radio signal to another communication device (not illustrated).

Moreover, in the second communication path 202, the modulation module 21 may receive the second radio signal transmitted by another communication device through the antenna 29. The first modulation circuit 24 of the modulation module 21 receives the second radio frequency signal through the second transceiver terminal 21b of the modulation module 21, and it may demodulate the second radio frequency signal to the second communication data signal by first modulation circuit 24, second modulation circuit 25 and the filter module 27b (achieving by firstly mixing the second radio frequency signal and the high frequency oscillating signal, and then mixing the signal mixed and the low frequency oscillating signal, and filtering the mixed frequency signal finally), and transmit the second communication data signal to the second communication circuit 23.

An end of a signal amplifier module 26a is coupled to the first modulation circuit 24, and another of the signal amplifier module 26a is coupled to the first transmitting terminal 21a. An end of a signal amplifier module 26b is coupled to the first modulation circuit 24, and another of the signal amplifier module 26a is coupled to the second transceiver terminal 21b. When transmitting the first radio frequency signal, the signal amplifier module 26a or 26b uses for amplifying the power of the first radio frequency signal, and the signal amplifier module 26b uses for amplifying the power of the second radio frequency signal, so as to improve the transmission quality when the antenna 29 transmitting. Wherein the data signal of the first communication system and the data signal of the second communication system use for generating the first radio frequency signal and the second radio frequency signal. When receiving the first radio frequency signal and the second radio frequency signal, the signal amplifier module 26b amplifying the power of the first radio frequency signal and the second radio frequency signal (e.g. low noise amplifier).

An end of the filter module 27a is coupled to the first communication circuit 22, another of the filter module 27a is coupled to the first modulation circuit 24, and the filter module 27a is sited on the first communication path 201. The end of the filter module 27b is coupled to the second communication circuit 23, another of the filter module 27b is coupled to the first modulation circuit 25, and the filter module 27b is sited on the second communication path 202. The filter module 27a and 27b use for removing the unnecessary part of the data signal of the first communication system, the unnecessary part of the data signal of the second communication system and the unnecessary part of signal in the signal mixing by the high frequency mixer 242 and the low frequency mixer 252, further use for amplifying the necessary part of signal. In the embodiment of present invention, the first modulation circuit 24 may mix the first radio frequency signal or the second radio frequency by the high frequency oscillator 241 and high frequency mixer 242, so as to let the first radio frequency signal and the second radio frequency after mixed to be the high frequency signal. Therefore, the filter modules 27a and 27b may be achieved by the high pass filter, which allows the high frequency signal but faints or removes the frequency below the cutoff frequency of the signal part, and amplifying the necessary part of signal. The first communication system and the second communication system may be the 2.4 GHz ISM protocol such as Bluetooth, 802.11b/g (WiFi) or Zigbee, and it also may be the communication system for another coexisting communication system of the non-ISM bandwidth. In short, the present invention isn't limited thereto.

It's worth noting, in the data transmitting of the second communication system, the first modulation circuit 24, the second modulation circuit 25 and the filter modules 27b may modulate the second radio frequency signal, or the second radio frequency signal may be generated when the data signal of the second communication system passes through the second modulation circuit 25 and the first modulation circuit 24. When demodulating the second radio frequency signal (that is the second transceiver terminal 21b for receiving the second radio frequency signal from another communication device, also receiving the signal by the second signal path 202), the high frequency mixer 242 of the first modulation circuit 24 receiving the signal from the antenna 29 mixes the second radio frequency signal with the high oscillating signal which is generated by the high frequency oscillator 241, and then transmitting the second radio frequency signal which is after mixed to the second modulation circuit 25. The second radio frequency signal which is after mixed (that is the high frequency signal) mixes with the low frequency oscillating signal which is generated by the low frequency oscillator 251 at the low frequency mixer 252 once again, so as to generate the mixing signal. After that, the filter module 27b filters the mixing frequency signal to generate the data signal of the second communication system. In other words, by the first modulation circuit 24, the second radio frequency signal is also as the high frequency signal after mixing, so as to may only fine tuning the frequency of the second radio frequency signal by the second modulation circuit 25. And then it may demodulate the data signal of the second communication system by the filtering of the filter module 27b.

When pre-transmitting the second radio frequency signal, the low frequency mixer 252 of the second modulation circuit 25 may advance first time mixing frequency for the data signal of the second communication system and the low frequency oscillating signal which is generated by the low frequency oscillator 251. And then, the data signal of the second communication system which is after mixed may be received by the first modulation circuit 24 and the first modulation circuit 24 may advance second time mixing. That is the high frequency mixer 242 of the first modulation circuit 24 may mix the mixing frequency signal which is generated by the low frequency mixer 252 with the high frequency oscillating signal which is generated by the high frequency oscillator 241, so as to generate the second radio frequency signal which is related to the second communication system, and completing the modulation. Finally, the second radio frequency signal transmits to the antenna 29 via the second transceiver terminal 21b.

In the data transmitting of the first communication system, the first modulation circuit 24 may modulate the first radio frequency signal, or the first radio frequency signal may be generated when the data signal of the first communication system passes through the first modulation circuit 24. When demodulating the first radio frequency signal (that is the second transceiver terminal 21b for receiving the first radio frequency signal from another communication device, also receiving the signal by the first signal path 201), the high frequency mixer 242 of the first modulation circuit 24 which is received by the antenna 29 mixes the first radio frequency signal with the high oscillating signal which is generated by the high frequency oscillator 241, then arranging in pairs by the filtering of the filter module 27a, so as to demodulate the data signal of the first communication system.

When pre-transmitting the first radio frequency signal, the high frequency mixer 242 of the first modulation circuit 24 may advance mixing frequency by the data signal of the first communication system and the high frequency oscillating signal which is generated by the high frequency oscillator 241, so as to generate the first radio frequency signal and completing the modulation. Finally, the first radio frequency signal transmits to the antenna 29 via the first transmitting terminal 21a or the second transceiver terminal 21b.

According to the above mentioned, whatever on the first signal path 201 or the second signal path 202, the signal which is received on the first signal path 201 and the second signal path 202 is the high frequency signal practically in demodulating for first radio frequency signal and the second frequency radio signal.

In other words, the data signal of the first communication system is generated from the first radio frequency signal which is demodulated by the high frequency oscillator 241 of the first modulation circuit 24, the high frequency mixer 242 and the filter module 27a. The data signal of the second communication system is generated as following. Firstly, the second radio frequency signal which is received mixes with the high frequency oscillator 241 of the first modulation circuit 24 with the high frequency mixer 242. Secondly, fining tuning the second radio frequency signal (that is the high frequency signal) after mixing by the low frequency oscillator 251 of the second modulation circuit 25 and the low frequency mixer 252, and demodulating the data signal of the second communication system by the filtering of the filter module 27b. The first radio frequency signal and the second radio frequency signal correspond to the data signal of the first communication system or the data signal of the second communication system respectively may be mixed by the identical high frequency mixer 242 of the first modulation circuit 24. After mixing, the second radio frequency signal may be fined tuning by the low frequency mixer 252 of the second modulation circuit 24 for the frequency of the data signal of the second communication system (after mixing the second radio signal, mixing with the low frequency oscillating signal). Therefore, the modulation module 21 of the embodiment in the present invention only uses one high frequency oscillator, so as to reduce the cost, area and/or power consumption for circuit structure for the modulation module 21.

Figure 3:
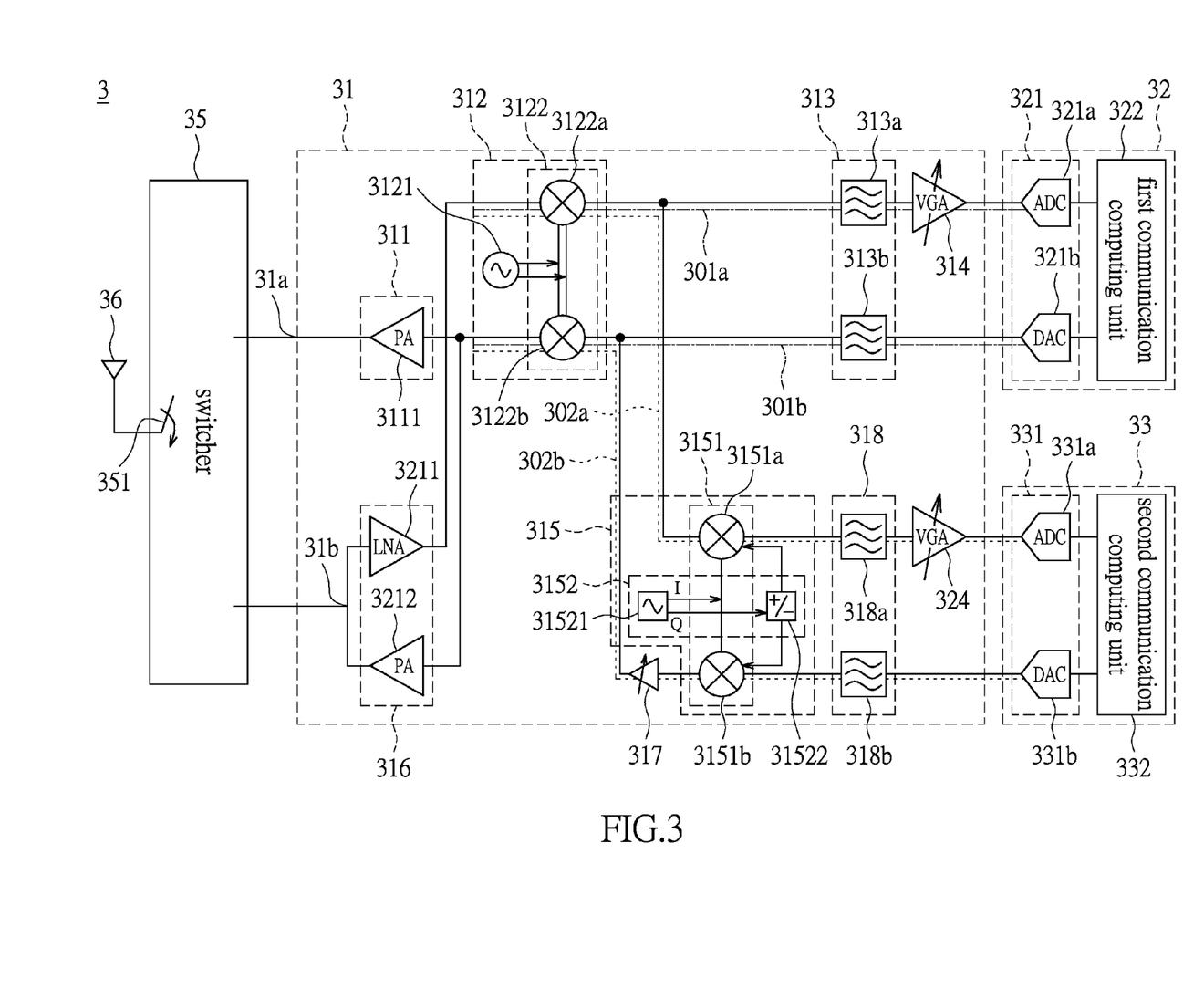
FIG. 3 shows a detailed block diagram of the multi-systems integrated modulation module according to an embodiment of the present invention.

Please referring to FIG. 3, FIG. 3 shows a detailed block diagram of the multi-systems integrated modulation module according to an embodiment of the present invention. A communication device includes modulation module 31, a first communication circuit 32, second communication circuit 33, switch 35 and an antenna 36. The first communication circuit 32 includes a digital-to-analog converting module 321 and a first communication computing unit 322. The second communication circuit 33 includes a digital-to-analog converting module 331 and a second communication computing unit 332. The modulation module 31 includes a first transmitting terminal 31a and a second transceiver terminal 31b. The modulation module 31 includes signal amplifier modules 311, 316, a first modulation circuit 312, a second modulation circuit 315, filters 313, 318 and voltage gain amplifiers 314, 324, 317. The signal amplifier module 311 includes a power amplifier 3111, the signal amplifier module 316 includes a low noise amplifier 3211 (LNA) and a power amplifier 3212 (PA). The modulation circuit 312 includes a high frequency oscillator 3121 and a high frequency mixer 3122. The second modulation circuit 315 includes a low frequency oscillator 3152 and a low frequency mixer 3151. The filter module 313 includes a filter 313a and a filter 313b; the filter module 318 includes a filter 318a and a filter 318b. The high frequency mixer 3122 further includes a high frequency receiving mixer 3122a and a high frequency transmitting mixer 3122b; the low frequency mixer 3151 further includes a low frequency receiving mixer 3151a and a low frequency transmitting mixer 3151b. The low frequency oscillator 3152 further includes an oscillating frequency generating unit 31521 and a plus-minus frequency controlling unit 31522. The digital-to-analog converting module 331 includes an analog-to-digital converter 331a and a digital-to-analog converter 331b; the digital-to-analog converting module 321 includes an analog-to-digital converter 321a and a digital-to-analog converter 321b.

In the communication device 3, the modulation module 31 is coupled to the first communication circuit 32 and the second communication circuit 33, and the first transmitting terminal 31a of the modulation module 31 and the second transceiver terminal 31b are coupled to the switch 35. The switch 35 is further coupled to the antenna 29.

In the modulation module 31, an end of the power amplifier 3111 is coupled to the first transmitting terminal 31a, and another end is coupled to the high frequency transmitting mixer 3122b. The low noise amplifier 3211 of the signal amplifier module 316 and the power amplifier 3212 of the signal amplifier module 316 are coupled to the second transceiver terminal 31b. Another end of the low noise amplifier 3211 is coupled to a first end of the high frequency receiving mixer 3122a, and another end of the power amplifier 3212 is coupled to a first end of the high frequency transmitting mixer 3122b. A second end of the high frequency receiving mixer 3122a is coupled to a first end of the low frequency receiving mixer 3151a, a second end of the high frequency transmitting mixer 3122b is coupled to a first end of the low frequency receiving mixer 3151b. The filters 313a and 313b are coupled to the second end of the high frequency receiving mixer 3122a and the second end of the high frequency transmitting mixer 3122b. The filters 318a and 318b are coupled to the second end of the low frequency receiving mixer 3151a and the second end of the low frequency transmitting mixer 3151b. The voltage gain amplifiers 314 and 324 are coupled to the filters 313a and 313b respectively. The voltage gain amplifier 317 is coupled between the high frequency transmitting mixer 3122b and the low frequency receiving mixer 3151a.

The first end of the analog-to-digital converter 321a of the first modulation circuit 32 is coupled to the voltage gain amplifier 314 of the modulation module 31; the first end of the analog-to-digital converter 321b of the first modulation circuit 32 is coupled to the filter 313b of the modulation module 31. The second end of the analog-to-digital converter 321a and the second end of the analog-to-digital converter 321b are coupled to first communication computing unit 322.

The first end of the analog-to-digital converter 331a of the second modulation circuit 33 is coupled to the voltage gain amplifier 324 of the modulation module 31; the first end of the analog-to-digital converter 331b of the second modulation circuit 33 is coupled to the filter 318b of the modulation module 31. The second end of the analog-to-digital converter 331a and the second end of the analog-to-digital converter 331b are coupled to the second communication computing unit 332.

In the embodiment of the present invention, the modulation module 31 includes a first signal receiving path 301a, a first signal transmitting path 301b, a second signal receiving path 302a and a second transmitting path 302b. The first signal receiving path 301a means the signal transmitting path is formed by the signal passing through the high frequency receiving mixer 3122a of the first modulation circuit 312, the filter 313a and the voltage gain amplifier 314; the first signal transmitting path 301b means the signal transmitting path is formed by the signal passing through the high frequency transmitting mixer 3122b, the first modulation circuit 312 and filter 313b. The second signal receiving path 302a means the signal receiving path which is formed by the signal passing through the high frequency receiving mixer 3122a of the first modulation circuit 312, the low noise amplifier 3152 of the second modulation circuit 315, the low frequency receiving mixer 3151a of the second modulation circuit 315, the filter 318a and the voltage gain amplifier 324; the second signal transmitting path 302b means the signal transmitting path is formed by the signal passing through the filter 318b, the low frequency receiving mixer 3151b of the first modulation circuit 312 and the high frequency receiving mixer 3122b of the first modulation circuit 312.

The first signal receiving path 301a and the first signal transmitting path 301b for modulating or demodulating when receiving or transmitting the data signal of the first communication system respectively. The second signal receiving path 302a and the second signal transmitting path 302b for modulating or demodulating when receiving or transmitting the data signal of the second communication system respectively. The detailed signal transmission process for the first signal receiving path 301a, the first signal transmitting path 301b, and the second signal receiving path 302a, the second signal transmitting path 302b are illustrated as following.

In the first signal receiving path 301a, the modulation module 31 may receive the first radio frequency signal which is received by the antenna 29 from another communication device by the switch 351 of the switch 35 connects to the second transceiver terminal 31b. At the same time, the first radio frequency signal is transmitted to the low noise amplifier 3211 via the second transceiver terminal 31b and amplified the low noise, so as to process the signal then. After that, the first radio frequency signal which is amplified is mixed by the first modulation module 312. In the first modulation module 312, the high frequency oscillator 3121 generates the high frequency oscillating signal, and mixes the high frequency oscillating signal with the first radio frequency signal which is amplified at the high frequency receiving mixer 3122a, so as to output the mixing frequency signal which related to the data signal of the first communication system. The mixing frequency signal removes the unnecessary part of the signal, so as to complete the demodulating of the first radio frequency signal. Hereafter, the voltage gain amplifier 314 amplifies the mixing frequency signal which is after filtered, and then outputs to the analog-to-digital converter 321a of the first modulation circuit 32. The analog-to-digital converter 321a transfers the mixing frequency signal which is after amplified, so as to obtain data signal of the first communication system. Finally, the first communication computing unit 322 receives the data signal and executes the data processing after.

In the first signal transmitting path 301b, the data signal of the first communication system is transmitted by the first communication computing unit 322 of the first communication circuit 32 and transferred to be as the analog data signal via the analog-to-digital converter 321b. After the filter 313b filters the analog data signal received by the filter 313b, the signal may be transferred to the first modulation circuit 312 and process mixing. The high frequency receiving mixer 3122b of the modulation circuit 312 mixes the high frequency oscillating signal which is generated by the high frequency oscillator 3121 with the data signal which is filtered after, so as to generate the first radio frequency signal. In the data signal of the first communication system transmitting process, with the switching timing of the switch 35, the first radio frequency signal which corresponds to the data signal of the first communication system is transmitted to the antenna 29 by the first transmitting terminal 31a or the second transceiver terminal 31b, and then transmitted to another communication device once again. If the first radio frequency signal is transmitted by the first transmitting terminal 31a, the first radio frequency signal may be amplified the signal power by the power amplifier 3111, and the signal may be transmitted then. Moreover, if the first radio frequency signal is transmitted by the second transceiver terminal 31b, the first radio frequency signal may be amplified the signal power by the power amplifier 3212, and the signal may be transmitted then.

In the second signal receiving path 302a, the modulation module 31 may receive the second radio frequency signal which is received by the antenna 29 from another communication device by the switch 351 of the switch 35 connects to the second transceiver terminal 31b. At the same time, the second radio frequency signal is transmitted to the low noise amplifier 3211 via the second transceiver terminal 31b and amplified the low noise, so as to process the signal then. The second radio frequency signal which is amplified process the first time mixing by the first modulation module 312. In the first modulation module 312, the high frequency oscillator 3121 generates the high frequency oscillating signal, and mixes the high frequency oscillating signal with the first radio frequency signal which is amplified at the high frequency receiving mixer 3122a, so as to output the mixing frequency signal to the second modulation circuit 315 and then processing the second time mixing. Hereafter, the low frequency receiving mixer 3151a of the second modulation circuit 315 mixes the second radio frequency signal which is received after high frequency mixing. It's worth noting, the low frequency oscillating signal of the low noise amplifier 3152 of the second modulation circuit 315 uses for adjusting the second radio frequency signal after high frequency mixing which is received. In other words, the second communication system needs the two-stage mixing by the first modulation circuit 312 and the second modulation circuit 315. The unnecessary part of the mixing frequency signal is filtered by the filter 318a, and then outputting the mixing frequency signal after filtered to the analog-to-digital converter 331a of the second communication circuit 33 by the voltage gain amplifier 324. The analog-to-digital converter 331a transfers the mixing frequency signal to obtain the data signal of the second communication system. Finally, the second communication computing unit 332 receives the data signal and executes the data processing after.

In the second signal transmitting path 302b, the data signal of the second communication system is transmitted by the second communication computing unit 332 of the first communication circuit 33 and is transferred to as the analog data signal via the analog-to-digital converter 331b and then transfers to the filter 318b of the modulation module 31. After the filter 318b filters the analog data signal received, the signal may be transferred to the second modulation circuit 315 and process first time frequency mixing. The low frequency receiving mixer 3151b of the modulation circuit 315 mixes the low frequency oscillating signal which is generated by the low frequency oscillator 3152 with the data signal which is after filtered. And then, the high frequency transmitting mixer 3122b the first modulation circuit 312 mixes the data signal which is after first time frequency mixing with the high frequency oscillating signal, so as to generate the second radio frequency signal. In the data signal of the second communication system transmitting process, with the switching timing of the switch 35, the second radio frequency signal is transmitted to the antenna 29 by the first transmitting terminal 31a or the second transceiver terminal 31b, and then transmitted to another communication device once again.

It's worth nothing, in the second signal transmitting path 302b, the data signal after first time frequency mixing which is outputted by the second modulation circuit 25 processes the gain adjustment by the voltage gain amplifier 317. For instance, if the first communication is the WiFi system, the second communication is the Bluetooth system, the signal power of the WiFi system is higher than the signal power of the Bluetooth system when the data is transmitted usually. Therefore, the signal power may be reduced by the voltage gain amplifier 317, and avoiding the oversize power of the Bluetooth signal effecting to the WiFi signal.

Figure 4:
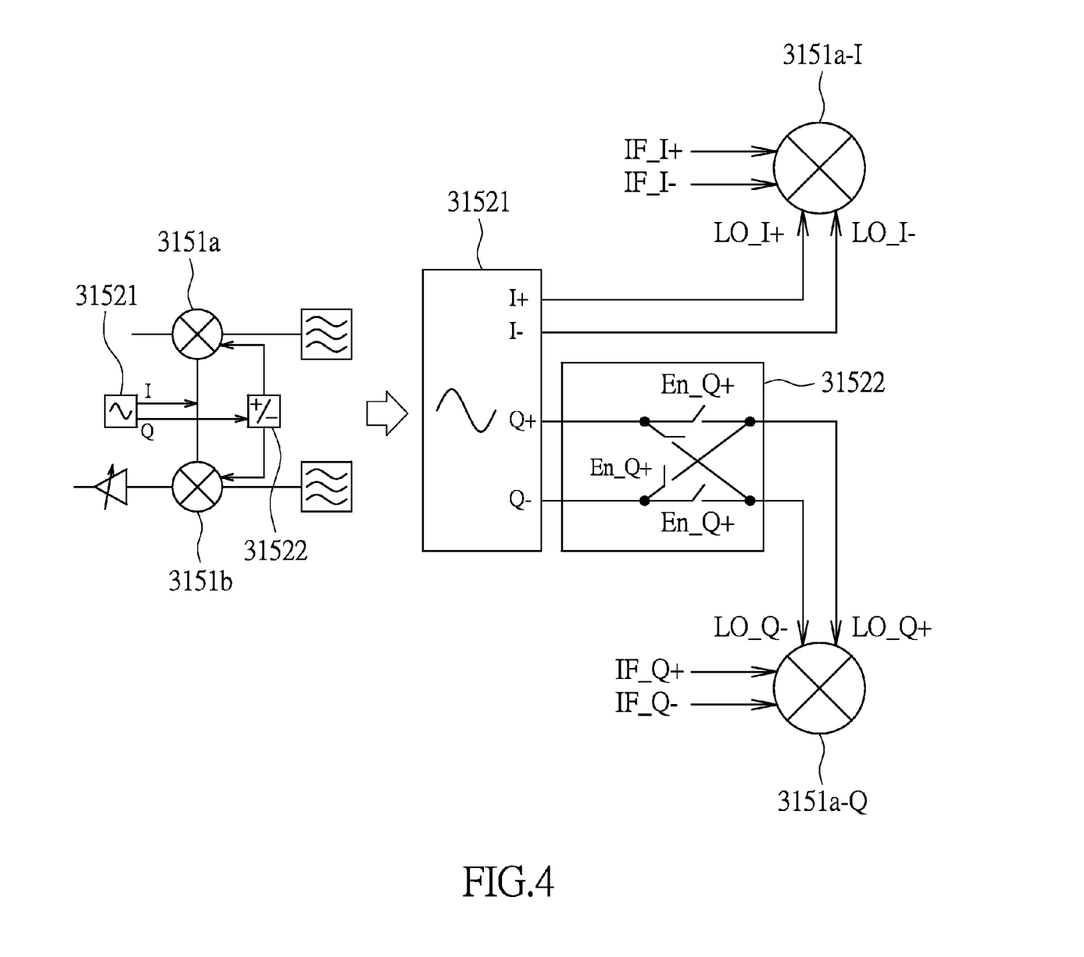
FIG. 4 shows a detailed block diagram of a second modulation module according to an embodiment of the present invention.

Please referring to FIG. 3 and FIG. 4, FIG. 4 shows a detailed block diagram of a second modulation module according to an embodiment of the present invention. The low frequency oscillator 3152 further includes the oscillating frequency generating unit 31521 and the plus-minus frequency controlling unit 31522. The oscillating frequency generating unit 31521 generates the low frequency signal (0~80 MHz). Therefore, the IQ imbalance causes by adding the plus-minus frequency controlling unit 31522 on the local oscillating path effects to the process slightly, so as to may achieve the small circuit area on the circuit design.

For example, the first communication is the WiFi system, the second communication is the Bluetooth. The most condition is that the Bluetooth and the WiFi open at the same time.

If both in the receiving node:

Condition 1: WiFi frequency=2437 MHz, Bluetooth frequency=2480 MHz:

The high frequency oscillating signal of the high frequency oscillator 3121 in FIG. 3 is FLO_[3121]=2437 MHz, the low frequency oscillating signal is FLO_[3152]=2480−F$_{if}$−2437 MHz>0 Hz (F$_{if}$ is the center oscillating frequency), the signal En_Q+="1" (means that the phase controlling switch En_Q+ is on).

Condition 2: WiFi frequency=2437 MHz, Bluetooth frequency=2404 MHz:

The high frequency oscillating signal of the high frequency oscillator 3121 in FIG. 3 is FLO_[3121]=2437 MHz, the low frequency oscillating signal is FLO_[3152]=2404−F$_{if}$−2437 MHz<0 Hz, the signal En_Q+="0" (means that the phase controlling switch En_Q+ is off).

The inphase output terminal Q+ and Q− are coupled to the oscillating frequency generating unit 31521, and the oscillating frequency generating unit 31521 controls the quadrature low frequency receiving mixer 3151a-Q to output the local inphase negative frequency LO_Q− and the local inphase positive frequency LO_Q+. Then, the local inphase negative frequency LO_Q− mixes with the center inphase negative frequency IF_Q− at the quadrature low frequency receiving mixer 3151a-Q, and the local inphase positive frequency LO_Q+ mixes with the center inphase positive frequency IF_Q+ at the quadrature low frequency receiving mixer 3151a-Q. In addition, the output terminal I+ of the quadrature phase of oscillating frequency generating unit 31521 outputs the local quadrature negative frequency LO_I+, and the output terminal I− of the quadrature phase of oscillating frequency generating unit 31521 outputs the local quadrature negative frequency LO_I−. Then, the local quadrature negative frequency LO_I+ mixes with center quadrature positive frequency IF_I+ at the inphase low frequency receiving mixer 3151a-I, the and the local quadrature negative frequency LO_I− mixes with the center quadrature negative frequency IF_I− at the inphase low frequency receiving mixer 3151a-I.

Therefore, in the condition 1, when the low frequency oscillating signal FLO__[3152] of the low frequency oscillator 3152 is granter than 0 Hz, the plus-minus frequency controlling unit 31522 turns the phase controlling switch En_Q+ on with the corresponding signal; and when the low frequency oscillating signal FLO__[3152] of the low frequency oscillator 3152 is less than 0 Hz, the plus-minus frequency controlling unit 31522 turns the phase controlling switch En_Q+ off with the corresponding signal. In here, FIG. 4 only illustrates by the low frequency receiving mixer 3151a, the action of the low frequency receiving mixer 3151b is similar to the low frequency receiving mixer 3151a, so it not repeats here.

Figure 5:
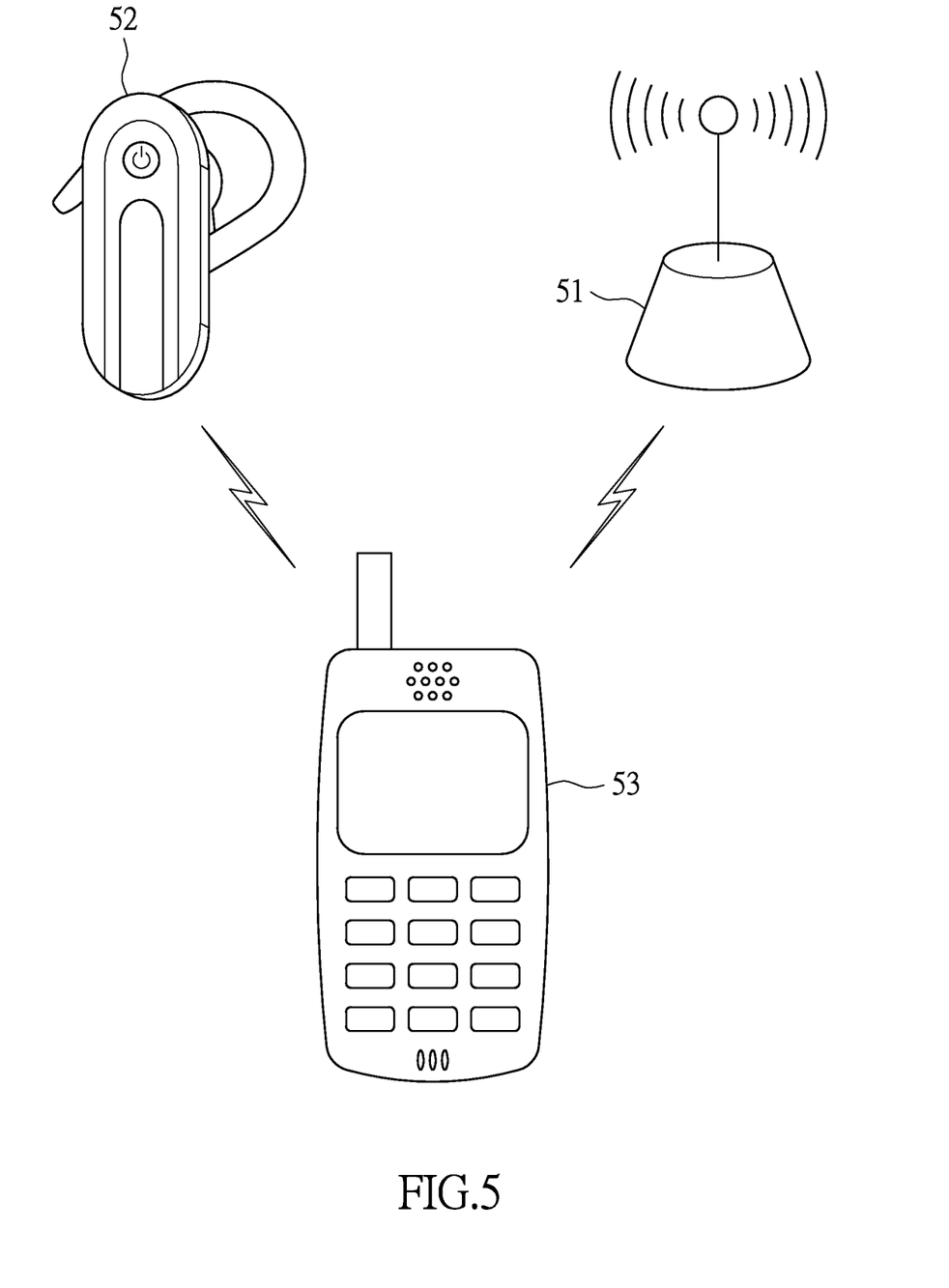
FIG. 5 shows an applied schematic diagram of the communication device according to an embodiment of the present invention.

Please referring to FIG. 5, FIG. 5 shows an applied schematic diagram of the communication device according to an embodiment of the present invention. The communication device in FIG. 5 includes the multi-systems integrated modulation module 31 above mentioned, and the communication device such as the phone 53. The phone 53 includes the multi-systems integrated modulation module 31 and an antenna 36, wherein the antenna 36 is coupled to the first transmitting terminal 31a end of the multi-systems integrated modulation module 31 and the second transceiver terminal 31b end of the multi-systems integrated modulation module 31. The antenna 36 uses for transmitting or receiving the first radio frequency signal or the second radio frequency signal after modulation. The first communication system may be the Bluetooth communication protocol, such as the Bluetooth communication system is formed by the Bluetooth phone 52 and the phone 53 in FIG. 5; the second communication system may be the 802.11b/g WiFi communication protocol, such as the WiFi communication system is formed by the WiFi base station 51 (WiFi AP) and the phone 53 in FIG. 5. Although the first communication system and second communication system illustrate by the Bluetooth and the WiFi system, but the present invention isn't limited thereto. For example, the first or second communication system also may use the Zigbee or other communication protocols in the same bandwidth.

Please refer to FIG. 3 again, because the embodiment of the present invention in FIG. 3 is two transmitting terminals (first transmitting terminal 31a and second transceiver terminal 31b). The second transceiver terminal 31b can transmit the Bluetooth and WiFi at the same time. However, the traditional circuit for the WiFi and Bluetooth is the three terminals method. But, the terminal of the WiFi and the terminal of Bluetooth are different, so the traditional method cannot transmit the signals at the same time.

Although the traditional method can transmit the signal at the same time as the present, but it usually take place when the search mode at beginning. In the other words, the Bluetooth and the WiFi search the device which is able to connect; or the condition for one is using and another is searching. But it's worth noting that the traditional structure cannot transmit the signal of the WiFi and the signal of the Bluetooth at the same time such as the present. The reason is that the tradition uses the three terminals switch antenna (e.g. the switch pin 151 of the switch 15 in FIG. 1 switching between the first transmitting terminal 11a, the second receiving terminal 11b and the transceiver terminal 12a).

Figure 6A:
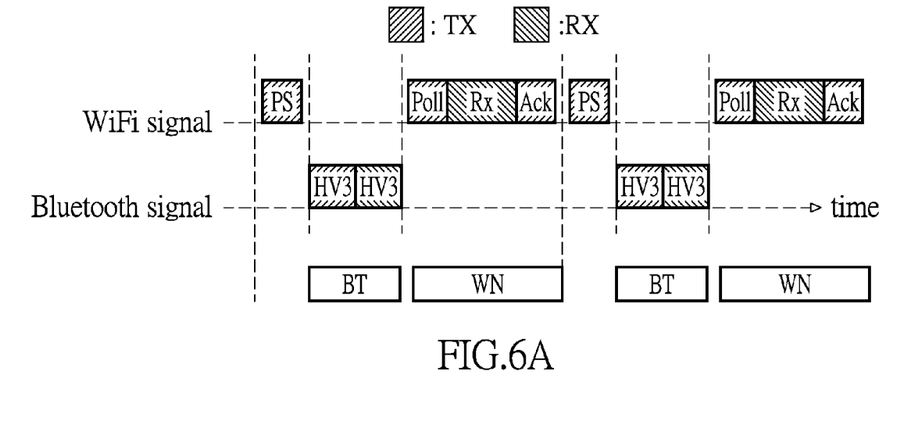
FIG. 6A shows a signal transmitting schematic diagram of the Wi-Fi signal and Bluetooth signal in the traditional communication device used the Wi-Fi and Bluetooth technology on the time schedule.

Please referring to FIG. 6A, FIG. 6A shows a signal transmitting schematic diagram of the Wi-Fi signal and Bluetooth signal in the traditional communication device used the Wi-Fi and Bluetooth technology on the time schedule. When the communication device used the WiFi and the Bluetooth protocols transmits the WiFi signal and the Bluetooth signal by the time-sharing scheduling, which is the coordinating method likes the packet traffic arbitration (PTA). But the above operating may cause the throughput of the Bluetooth and throughput of the WiFi reducing.

Figure 6B:
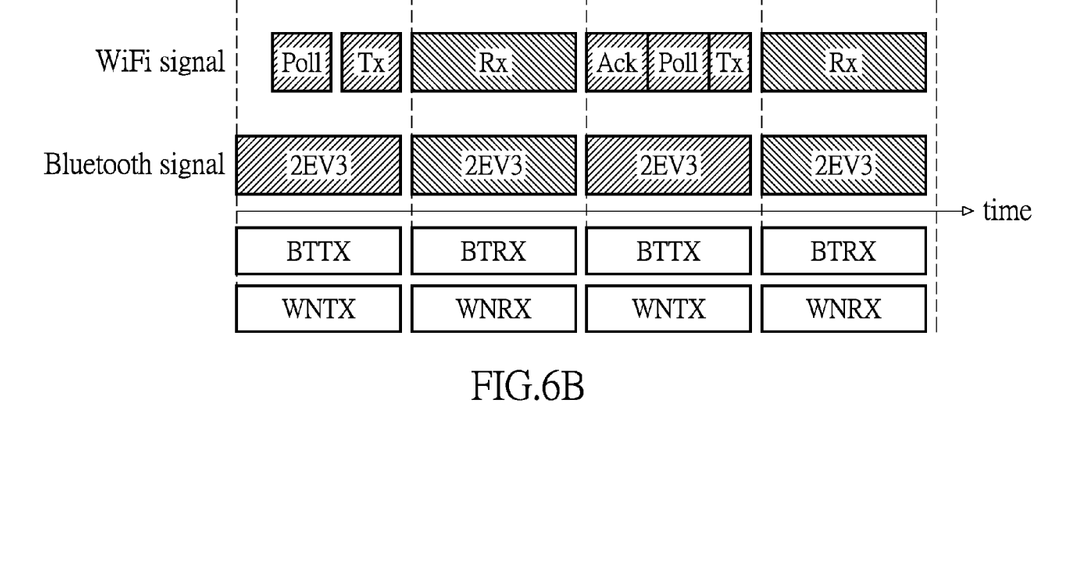
FIG. 6B shows a signal transmitting schematic diagram of the Wi-Fi signal and Bluetooth signal in the multi-systems integrated modulation module according to an embodiment of the present invention on the time schedule.

Please referring to FIG. 6B, FIG. 6B shows a signal transmitting schematic diagram of the Wi-Fi signal and Bluetooth signal in the multi-systems integrated modulation module according to an embodiment of the present invention on the time schedule. The modulation module 31 of the embodiment in the present invention uses the two terminals switch antenna (e.g. the switch pin 351 of the switch 35 in FIG. 3 switching between the first transmitting terminal 31a and the second receiving terminal 31b). Therefore, the present can use the coordinating method likes the packet traffic arbitration, so as to transmit and receive at the same time (e.g. in FIG. 6B, the BTTX and WNTX transmit the packet at the same frame, BTRX and WNRX receive the packet at the same frame). The above operating may cause the throughput of the Bluetooth and throughput of the WiFi raising.

In summary, in the multi-systems integrated modulation module provided by the exemplary embodiment of the present, a combining method that a high frequency oscillator to be the major frequency mixer and a low frequency oscillator to fine tuning the frequency is used, it may generate a first communication path signal and a second communication path signal respectively. Avoiding the frequency pulling effect or the interference between the different communication circuits which have to use the high frequency oscillators to modulate the different signals of communication systems in traditional. Furthermore, the circuit area of low frequency oscillator doesn't like the high frequency oscillator, which needs larger area. It reduces the area of the communication circuit and the cost of the manufacturing efficaciously.

It is worth noting, by the multi-systems integrated modulation module provided by the exemplary embodiment of the present invention may receive and transmit the first communication system signal and the second communication system signal simultaneously, since the present invention may raise the traffic and the transmission quality effectively.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A multi-systems integrated modulation module, having at least one of transceiver terminals, the modulation module comprising:
    a first modulation circuit, comprising:
        a high frequency oscillator, providing at least one of high frequency signals; and
        at least one of high frequency mixers, coupled to the high frequency oscillator, using to mix at least one of radio signals and the high frequency signal which passes through the high frequency mixer; and
    a second modulation circuit, coupled to the first modulation circuit, the second modulation circuit comprising:
        a low frequency oscillator, providing at least one of low frequency signals; and
        at least one of low frequency mixers, coupled to the low frequency oscillator, using to mix the radio signal and the low frequency signal which passes through the low frequency mixer;
    wherein the modulation module forms a first signal path by the first modulation circuit, and forms a second signal path by the first modulation circuit and the second modulation circuit.

2. The modulation module according to claim 1, wherein the low frequency oscillator comprises:
    an oscillating frequency generating unit, for generating a low oscillated frequency; and
    a plus-minus frequency controlling unit, an end of the plus-minus frequency controlling unit is coupled to the oscillating frequency generating unit, another end of the plus-minus frequency controlling unit is coupled to the low frequency mixers, the plus-minus frequency controlling unit for controlling the inphase of the low oscillated frequency.

3. The modulation module according to claim 1, wherein comprises:
    At least one of power amplifiers, coupled to at least one of transceiver terminals, for amplifying the radio frequency signals outputted by the first signal path and the second signal path.

4. The modulation module according to claim 1, wherein comprises:
    At least one of filters, are sited on the first signal path and the second signal path, for filtering the receiving radio signals.

5. The modulation module according to claim 1, wherein further comprises:
    a low noise amplifier, coupled to the transceiver terminal.

6. The modulation module according to claim 1, wherein the first signal path comprises:
    a first signal transmitting path, for receiving the radio frequency signal from a first communication circuit and transmitting the radio frequency signal to the transceiver terminal via the first modulation circuit; and
    a first signal receiving path, for receiving the radio frequency signal from the transceiver and transmitting the radio frequency signal to the first communication circuit via the first modulation circuit.

7. The modulation module according to claim 1, wherein the second signal path comprises:
    a second signal transmitting path, for receiving the radio frequency signal from a second communication circuit and transmitting the radio frequency signal to the transceiver terminal via the first modulation circuit and the second modulation circuit; and
    a second signal receiving path, for receiving the radio frequency signal from the transceiver terminal and transmitting the radio frequency signal to the second communication circuit via the first modulation circuit and the second modulation circuit.

8. The modulation module according to claim 1, wherein the radio frequency signal is at least one of data signals generated by the first communication circuit or the second communication circuit.

9. The modulation module according to claim 1, wherein the high frequency mixer comprises:
a high frequency receiving mixer, for mixing the receiving radio frequency signal by the first signal path and the second signal receiving path with the high frequency signal; and
a high frequency transmitting mixer, for mixing the transmitting radio frequency signal by the first signal path or the second signal transmitting path with the high frequency signal.

10. The modulation module according to claim 1, wherein the low frequency mixer comprises:
a low frequency receiving mixer, for mixing the receiving radio frequency signal by the second signal path with the low frequency signal; and
a low frequency transmitting mixer, for mixing the transmitting radio frequency signal by the second signal path with the low frequency signal.

11. A communication device, comprising:
a modulation module, having at least one of transceiver terminals, the modulation module comprising:
a first modulation circuit, comprising:
a high frequency oscillator, providing at least one of high frequency signals; and
at least one of high frequency mixers, coupled to the high frequency oscillator, using to mix at least one of radio frequency signals and the high frequency signal which passes through the high frequency mixer; and
a second modulation circuit, coupled to the first modulation circuit, the second modulation circuit comprising:
a low frequency oscillator, providing at least one of low frequency signals; and
at least one of low frequency mixers, coupled to the low frequency oscillator, using to mix the radio signal and the low frequency signal which passes through the low frequency mixer; and
an antenna, coupled to at least one of the transceiver terminals of the modulation module, the antenna for receiving or transmitting the radio frequency signal;
wherein the modulation module forms a first signal path by the first modulation circuit, and forms a second signal path by the first modulation circuit and the second modulation circuit.

12. The modulation module according to claim 11, wherein the low frequency oscillator comprises:
an oscillating frequency generating unit, for generating a low oscillated frequency; and
a plus-minus frequency controlling unit, an end of the plus-minus frequency controlling unit is coupled to the oscillating frequency generating unit, another end of the plus-minus frequency controlling unit is coupled to the low frequency mixers, the plus-minus frequency controlling unit for controlling the inphase of the low oscillated frequency.

13. The modulation module according to claim 11, wherein comprises:
At least one of power amplifiers, coupled to at least one of transceiver terminals, for amplifying the radio frequency signals outputted by the first signal path and the second signal path.

14. The modulation module according to claim 11, wherein comprises:
At least one of filters, are sited on the first signal path and the second signal path, for filtering the receiving radio signals.

15. The modulation module according to claim 11, wherein further comprises:
a low noise amplifier, coupled to the transceiver terminal.

16. The modulation module according to claim 11, wherein the first signal path comprises:
a first signal transmitting path, for receiving the radio frequency signal from a first communication circuit and transmitting the radio frequency signal to the transceiver terminal via the first modulation circuit; and
a first signal receiving path, for receiving the radio frequency signal from the transceiver and transmitting the radio frequency signal to the first communication circuit via the first modulation circuit.

17. The modulation module according to claim 11, wherein the second signal path comprises:
a second signal transmitting path, for receiving the radio frequency signal from a second communication circuit and transmitting the radio frequency signal to the transceiver terminal via the first modulation circuit and the second modulation circuit; and
a second signal receiving path, for receiving the radio frequency signal from the transceiver terminal and transmitting the radio frequency signal to the second communication circuit via the first modulation circuit and the second modulation circuit.

18. The modulation module according to claim 11, wherein the radio frequency signal is at least one of data signals generated by the first communication circuit or the second communication circuit.

19. The modulation module according to claim 11, wherein the high frequency mixer comprises:
a high frequency receiving mixer, for mixing the receiving radio frequency signal by the first signal path and the second signal receiving path with the high frequency signal; and
a high frequency transmitting mixer, for mixing the transmitting radio frequency signal by the first signal path or the second signal transmitting path with the high frequency signal.

20. The modulation module according to claim 11, wherein the low frequency mixer comprises:
a low frequency receiving mixer, for mixing the radio frequency signal received by the second signal path with the low frequency signal; and
a low frequency transmitting mixer, for mixing the radio frequency signal transmitted by the second signal path with the low frequency signal.

* * * * *